US012753127B1

(12) United States Patent
Kedir et al.

(10) Patent No.: US 12,753,127 B1
(45) Date of Patent: Oct. 6, 2026

(54) METHOD TO CONTROL DISSOLUTION OF SILICON CARBIDE DURING FABRICATION OF A CERAMIC MATRIX COMPOSITE

(71) Applicant: Rolls-Royce High Temperature Composites Inc., Cypress, CA (US)

(72) Inventors: Nesredin Kedir, Cypress, CA (US); Pathikumar Sellappan, Cypress, CA (US); Sungbo Shim, Cypress, CA (US)

(73) Assignee: Rolls-Royce High Temperature Composites, Inc., Cypress, CA (US)

( * ) Notice: Subject to any disclaimer, the term of this patent is extended or adjusted under 35 U.S.C. 154(b) by 913 days.

(21) Appl. No.: 17/964,755

(22) Filed: Oct. 12, 2022

Related U.S. Application Data

(60) Provisional application No. 63/275,521, filed on Nov. 4, 2021.

(51) Int. Cl.

| | |
|---|---|
| ***C04B 41/88*** | (2006.01) |
| ***C04B 35/565*** | (2006.01) |
| ***C04B 35/628*** | (2006.01) |
| ***C04B 41/51*** | (2006.01) |

(52) U.S. Cl.

CPC ............ *C04B 41/88* (2013.01); *C04B 35/565* (2013.01); *C04B 35/62863* (2013.01); *C04B 35/62868* (2013.01); *C04B 41/5183* (2013.01); *C04B 2235/3826* (2013.01); *C04B 2235/386* (2013.01); *C04B 2235/5244* (2013.01); *C04B 2235/616* (2013.01)

(58) Field of Classification Search

CPC .......... C04B 35/62857; C04B 41/5183; C04B 41/88; C04B 41/51; C04B 41/81

See application file for complete search history.

(56) References Cited

U.S. PATENT DOCUMENTS

| | | | |
|---|---|---|---|
| 4,944,904 A | 7/1990 | Singh et al. | |
| 5,955,391 A | 9/1999 | Kameda et al. | |
| 6,235,379 B1 * | 5/2001 | Kameda | C04B 35/80 428/408 |
| 6,245,424 B1 | 6/2001 | Lau et al. | |

(Continued)

FOREIGN PATENT DOCUMENTS

| | | |
|---|---|---|
| DE | 3915509 | * 10/2000 |
| JP | 2004510674 | * 4/2004 |
| JP | 3673011 | * 7/2005 |

OTHER PUBLICATIONS

Bale et. al., "FactSage Thermo-Mechanical Software and Databases," Calphad, 26, 2 (2002) pp. 189-228.

(Continued)

*Primary Examiner* — Tabassom Tadayyon Eslami

(74) *Attorney, Agent, or Firm* — Shumaker & Sieffert, P.A.

(57) ABSTRACT

A method of controlling dissolution of silicon carbide during melt infiltration to form a ceramic matrix composite includes depositing an interface coating comprising boron nitride on silicon carbide fibers, and depositing a barrier coating comprising silicon carbide on the interface coating. After depositing the barrier coating, a fiber preform comprising the silicon carbide fibers is infiltrated with a melt comprising a silicon-boron alloy that includes boron at a concentration between 0.4 wt. % and 3.3 wt. %. The melt is then cooled to form a ceramic matrix composite.

15 Claims, 3 Drawing Sheets

(56) References Cited

U.S. PATENT DOCUMENTS

| | | | | |
|---|---|---|---|---|
| 2002/0019306 A1* | 2/2002 | Petrak | C04B 35/62871 | 501/95.2 |
| 2016/0009602 A1* | 1/2016 | Brun | C04B 35/62871 | 156/89.11 |
| 2017/0057879 A1* | 3/2017 | Harris | C04B 35/5618 | |

OTHER PUBLICATIONS

Corman et al., "Silicon melt infiltrated ceramic composites (HiPerComp™)," In: N.P. Bansal ed., Handbook of ceramic composites. Boston: Kluwer Academic Publishers, (2005), pp. 99-115.
Dalaker et al., "Time and Temperature Dependence of the Solubility of Carbon in Liquid Silicon Equilibrated with Silicon Carbide and its Dependence on Boron Levels," Mater. Trans., 50, 5 (2009), pp. 1152-1156.
Ness et al., "Microstructural Evolution in Reaction-Bonded Silicon Carbide," J. Mater. Sci., 21 (1986), pp. 1377-1397.
Yanaba et al., "Effect of Alloying Elements in Carbon Solubility in Liquid Silicon Equilibrated with Silicon Carbide," Mater. Trans. JIM, 39, 8 (1998), pp. 819-823.

* cited by examiner

METHOD TO CONTROL DISSOLUTION OF SILICON CARBIDE DURING FABRICATION OF A CERAMIC MATRIX COMPOSITE

RELATED APPLICATION

The present patent document claims the benefit of priority under 35 U.S.C. § 119 (e) to U.S. Provisional Patent Application No. 63/275,521, which was filed on Nov. 4, 2021, and is hereby incorporated by reference in its entirety.

TECHNICAL FIELD

This disclosure relates generally to fabrication of ceramic matrix composites and more particularly to a method for controlling silicon carbide dissolution during melt infiltration.

BACKGROUND

Gas turbine engines include a compressor, combustor and turbine in flow series along a common shaft. Compressed air from the compressor is mixed with fuel in the combustor to generate hot combustion gases that rotate the turbine blades and drive the compressor. Improvements in the thrust and efficiency of gas turbine engines are linked to increasing turbine entry temperatures, which places a heavy burden on turbine engine components. Ceramic matrix composites, which include ceramic fibers embedded in a ceramic matrix, exhibit a combination of properties that make them promising candidates for gas turbine engine components and other industrial applications that demand excellent thermal and mechanical properties along with low weight. A ceramic matrix composite that includes a silicon carbide matrix reinforced with silicon carbide fibers may be referred to as a silicon carbide/silicon carbide composite or SiC/SiC composite. Fabrication of a SiC/SiC composite may include slurry and melt infiltration steps to densify a silicon carbide fiber preform. A challenge is preventing degradation of the fibers and/or any fiber coatings during melt infiltration.

BRIEF DESCRIPTION OF THE DRAWINGS

The embodiments may be better understood with reference to the following drawings and description.

DETAILED DESCRIPTION

Silicon alloys employed for melt infiltration in manufacturing ceramic matrix composites may include additives to improve wettability, protect fiber coatings from dissolution, and/or form high temperature phases. However, some additives, such as boron, may increase the solubility of carbon in silicon. This can be detrimental as it may lead to increased dissolution of silicon carbide fibers and barrier coatings that include silicon carbide. The method described in this disclosure may help to control silicon carbide dissolution during melt infiltration.

Figure 1:
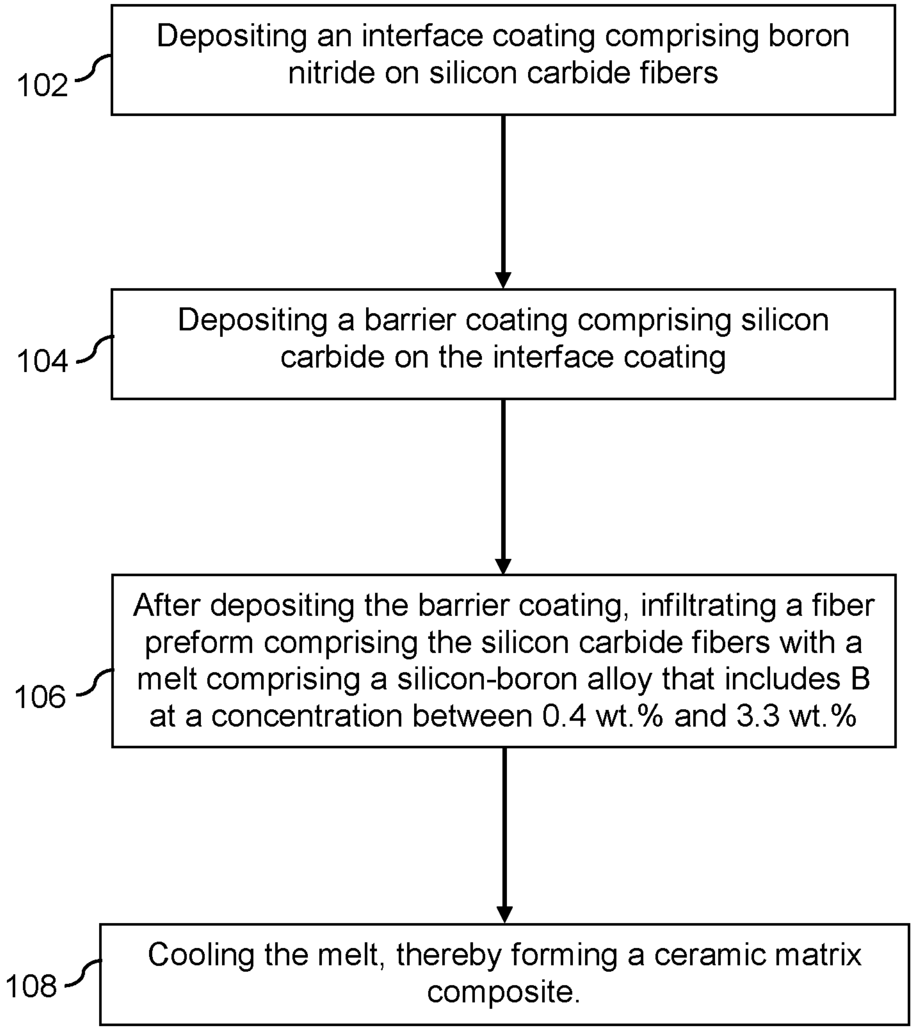
FIG. 1 is a flow chart showing exemplary steps of one approach to control dissolution of silicon carbide during fabrication of a ceramic matrix composite.

Referring to FIG. 1, the method includes depositing 102 an interface coating comprising boron nitride (e.g., boron nitride or silicon-doped boron nitride) on silicon carbide fibers. The interface coating may provide a weak fiber-matrix interface once the CMC is formed, which can be beneficial for fracture toughness. A barrier coating comprising silicon carbide, which is intended to serve as a protective layer for the boron nitride during CMC fabrication, is deposited 104 on the interface coating. The interface coating and the barrier coating may be deposited by chemical vapor infiltration, as described below, or using another suitable deposition process. After depositing the barrier coating, a fiber preform comprising the silicon carbide fibers is infiltrated with a melt comprising a silicon-boron alloy that includes boron at a concentration between 0.4 wt. % and 3.3 wt. %. Prior to infiltration with the melt ("melt infiltration"), the fiber preform may undergo slurry infiltration, as described below. Upon cooling 108 of the melt, a ceramic matrix composite is formed.

Figure 2:
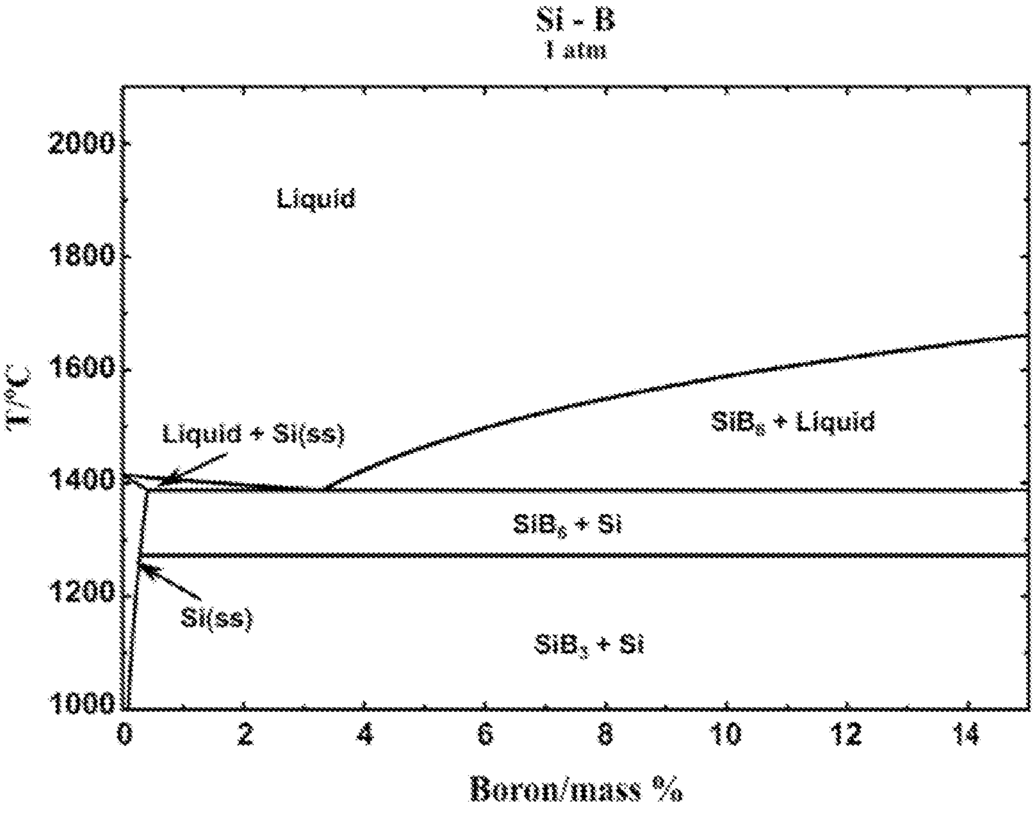
FIG. 2 shows a binary phase diagram for a silicon-boron alloy.

The inventors have recognized that incorporating boron into the melt within the above concentration range may have several advantages. First, maintaining the boron content at 3.3 wt. % or less can mitigate the enhanced SiC dissolution associated with increased carbon solubility in silicon at higher boron contents. Additionally, within the selected range of boron concentrations, infiltration of the fiber preform with the melt may take place at a temperature below the melting temperature ($T_m$) of silicon. Referring to the silicon-boron phase diagram in FIG. 2, it can be seen that a boron concentration below the eutectic composition (about 3.3 wt. % B) is preferable to maintain the melting point below about 1420° C., or more specifically below 1414° C., the $T_m$ of silicon. Consequently, the silicon-boron alloy may undergo melt infiltration at a temperature of about 1410° C. or less, about 1400° C. or less, and as low as about 1385° C. (at the eutectic composition). Additionally, a boron concentration above about 0.4 wt. % is desirable to promote the formation of high temperature phases, in particular, silicon borides (sometimes referred to as boron silicides), which may include $SiB_3$, $SiB_4$, and/or $SiB_6$.

In contrast to previous approaches to reduce dissolution, where the alloying element employed for melt infiltration was chosen to match the active species in the barrier coating, the alloying element (boron) utilized in this new approach does not appear in the barrier coating. Previously, for example, carbon was used as the alloying element if the melt was to come into contact with a silicon carbide barrier coating in order to eliminate the driving force for dissolution of the silicon carbide (i.e., the concentration gradient). However, this traditional approach may introduce additional technical challenges; for example, carbon additions are known to increase the solvus temperature (i.e., melting point) of silicon since the solid solubility of carbon in silicon is low. Accordingly, in the method described in this disclosure, the melt comprising the silicon-boron alloy does not include carbon, at least not in the initial state as the melt begins to infiltrate the fiber preform. In addition, other additives to the melt (e.g., Cr, Ti, V, and/or Mo) are not required.

Advantageously, an additional protective layer may not need to be deposited on the barrier coating due to the reduced dissolution of silicon carbide; instead, the barrier coating may be directly exposed to the melt comprising the silicon-boron alloy. Since dissolution of the silicon carbide is controlled, the barrier coating may better retain its physical integrity during exposure to the melt. For example, cracking may be decreased or avoided. Also or alternatively, the thickness of the barrier coating after infiltration with the melt may be at least about 70% and up to 100% of the thickness of the barrier coating prior to melt infiltration.

To form the melt, silicon and boron may be constrained in a crucible and heated preferably to a temperature below the melting temperature of silicon. Pure elemental forms of the alloying element (e.g., boron powder or pellets) and/or carbides of the alloying element may be used. As indicated above, the melt may include a silicon-boron alloy comprising boron at a concentration between 0.4 wt. % and 3.3 wt. %. To carry out melt infiltration, the fiber preform is placed in contact with the melt, either directly or via a wick material (e.g., graphite felt), and the melt is drawn into the fiber preform via capillary action. Melt infiltration may be aided by a fiber coating (e.g., the barrier layer) and/or particles contained in the fiber preform (e.g., carbon, metal carbide (e.g., SiC), and/or metal nitride particles) that are readily wetted by the molten silicon alloy. The particles may be introduced into the fiber preform prior to melt infiltration during a slurry infiltration step, as described below. Typically, melt infiltration takes place over a time duration of 15 minutes to four hours, depending in part on the size and complexity of the ceramic matrix composite being fabricated. Densification occurs as the silicon alloy reacts with free carbon and carbon-containing compounds within the fiber preform to form, upon cooling, a ceramic matrix composite including a ceramic matrix comprising silicon carbide surrounding the silicon carbide fibers. In addition to the silicon carbide, the ceramic matrix may include a high temperature silicon boride phase, such as $SiB_3$ and/or $SiB_6$, and/or a small amount of residual (unreacted) silicon. Cooling of the melt may entail passive or active cooling to room temperature (e.g., 20-25° C.).

Figure 3:
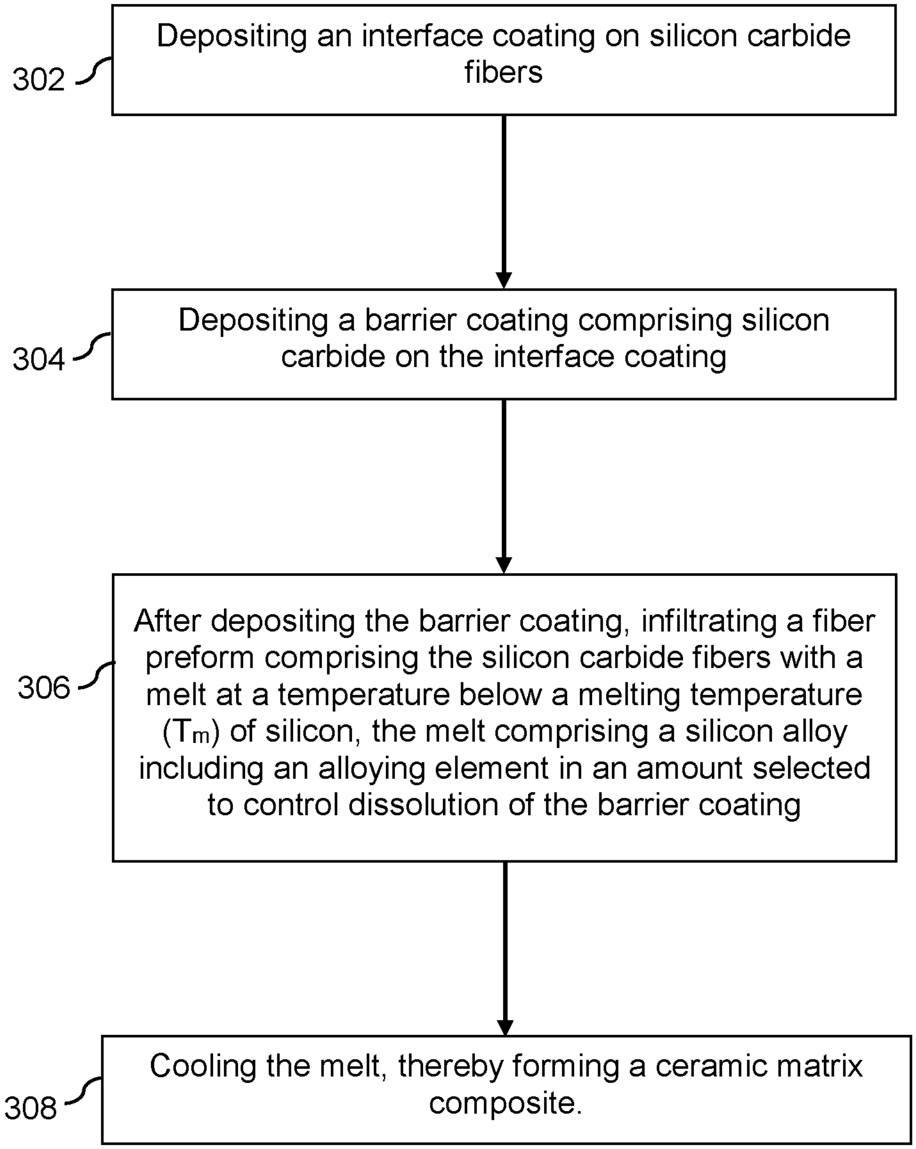
FIG. 3 is a flow chart showing exemplary steps of another approach to control dissolution of silicon carbide during fabrication of a ceramic matrix composite.

Referring now to the flow chart of FIG. 3, the method of controlling dissolution of silicon carbide during melt infiltration is described according to another aspect. The method includes depositing 102 an interface coating comprising boron nitride on silicon carbide fibers. The interface coating may provide a weak fiber-matrix interface once the CMC is formed, which can be beneficial for fracture toughness. A barrier coating comprising silicon carbide, which is intended to serve as a protective layer for the boron nitride during CMC fabrication, is deposited 104 on the interface coating. The interface coating and the barrier coating may be deposited by chemical vapor infiltration, as described below, or using another suitable deposition process. After depositing the barrier coating, a fiber preform comprising the silicon carbide fibers is infiltrated with a melt at a temperature ("melt infiltration temperature") below a melting temperature ($T_m$) of silicon. The melt comprises a silicon alloy including an alloying element that reduces the melting point relative to pure silicon. The alloying element is included in an amount selected to control dissolution of the barrier coating. Upon cooling 108 of the melt, a ceramic matrix composite is formed.

In contrast to prior art methods of controlling SiC dissolution, where the alloying element employed for melt infiltration matches the active species (e.g., carbon) in the barrier coating, the alloying element utilized in this new approach does not appear in the barrier coating. Preferably, the alloying element comprises boron, and the melt comprises a silicon-boron alloy. As discussed above, the silicon-boron phase diagram of FIG. 2 reveals that a boron concentration below the eutectic composition (about 3.3 wt. % B) is preferable to maintain the melting point below about 1420° C., or more specifically below 1414° C., the $T_m$ of silicon. For example, the melting temperature of the silicon-boron alloy may be about 1410° C. or less, about 1400° C. or less, and as low as about 1385° C. (at the eutectic composition). It is preferred to carry out melt infiltration at lower temperatures to reduce the likelihood of damage to the fiber and coatings; also, energy usage and consequently processing costs may be reduced. In addition, maintaining the boron content at 3.3 wt. % or less can mitigate the enhanced SiC dissolution associated with increased carbon solubility in silicon at higher boron contents. Also, a boron concentration above about 0.4 wt. % may promote the formation of high temperature phases, in particular, silicon borides (sometimes referred to as boron silicides), which may include $SiB_3$, $SiB_4$, and/or $SiB_6$. Accordingly, it may be advantageous for the silicon-boron alloy to include boron at a concentration between 0.4 wt. % and 3.3 wt. %. Preferably, the melt comprising the silicon-boron alloy does not include carbon, at least in an initial state as the melt begins to infiltrate the fiber preform. In addition, other additives to the melt are not required.

Since dissolution of the barrier coating is controlled using the approach shown in FIG. 3, an additional protective coating may not need to be formed on the barrier coating, as with prior art approaches; instead, the barrier coating may be directly exposed to the melt comprising the silicon alloy. In addition, the barrier coating may better retain its physical integrity during exposure to the melt. For example, cracking may be decreased or avoided. Also or alternatively, the thickness of the barrier coating after infiltration with the melt may be at least about 70% and up to 100% of the thickness of the barrier coating prior to melt infiltration.

Melt infiltration may proceed as described above. To form the melt, silicon and the selected alloying element (e.g., boron) may be constrained in a crucible and heated to less than the melting temperature of silicon. Pure elemental forms of the alloying element may be preferred. As described above, the melt may comprise a silicon-boron alloy including between 0.4 wt. % B and 3.3 wt. % B. To carry out melt infiltration, the fiber preform is placed in contact with the melt, either directly or via a wick material (e.g., graphite felt), and the melt is drawn into the fiber preform via capillary action. Melt infiltration may be aided by a fiber coating (e.g., the barrier layer) and/or particles contained in the fiber preform (e.g., carbon, metal carbide (e.g., SiC), and/or metal nitride particles) that are readily wetted by the molten silicon alloy. The particles may be introduced into the fiber preform prior to melt infiltration during a slurry infiltration step, as described below. Typically, melt infiltration takes place over a time duration of 15 minutes to four hours, depending in part on the size and complexity of the ceramic matrix composite being fabricated. Densification occurs as the silicon alloy reacts with free carbon and carbon-containing compounds within the fiber preform to form, upon cooling, a ceramic matrix composite including a ceramic matrix comprising silicon carbide surrounding the silicon carbide fibers. In addition to the silicon carbide, the ceramic matrix may include a high temperature silicon boride phase, such as $SiB_3$, $SiB_4$, and/or $SiB_6$, and/or a small amount of residual (unreacted) silicon. Cooling of the melt may entail passive or active cooling to room temperature (e.g., 20-25° C.).

The fiber preform employed for the method according to FIGS. 1 and 3 may be assembled by laying up a plurality of plies, where each ply may comprise tows of silicon carbide fibers arranged in a two- or three-dimensional weave. It is noted that assembly of the fiber preform may occur prior to or after deposition of the interface and barrier coatings. In some examples, the boron nitride of the interface coating may further include a silicon dopant, such that the interface coating comprises silicon-doped boron nitride. The method may further comprise, prior to infiltrating the fiber preform with the melt, infiltrating the fiber preform with a slurry comprising silicon carbide particles dispersed in a liquid carrier (e.g., water). This process may be referred to as slurry infiltration of the fiber preform. The slurry may include, in addition to the silicon carbide particles, other particulate matter dispersed in the liquid carrier, such as reactive elements/particles (e.g., carbon or carbon containing particles) to form an impregnated fiber preform, i.e., a fiber preform loaded with silicon carbide and optionally other particles. The particles may include coarse and fine particles. Following slurry infiltration, the fiber preform may be dried to remove the liquid carrier, which is typically water.

The interface and barrier coatings utilized in the approaches described above may be deposited by chemical vapor infiltration or another suitable deposition process. Generally speaking, chemical vapor infiltration (CVI) entails flowing gaseous reagents at an elevated temperature through a furnace or reaction chamber containing one or more porous specimens to be coated. The one or more porous specimens may comprise any arrangement of the silicon carbide fibers (e.g., a fiber preform as described above), where interstices between adjacent silicon carbide fibers may be understood to constitute pores. During CVI, the gaseous reagents may infiltrate the porous specimen(s) (e.g. the fiber preform) and chemically react to form a deposit, coating or layer on exposed surfaces of the silicon carbide fibers. The porous specimen(s) may be untooled or constrained with a tool during deposition. A suitable tool may include through-holes for passage of the gaseous reagents and may be formed of a chemically inert and/or refractory material, such as graphite or silicon carbide, which is stable at the elevated temperatures at which deposition take place. Through-holes in the tool may have a diameter or width sized to allow for a sufficient flow of gaseous reactants into the porous specimen during CVI. The tool may have a single-piece or multi-piece construction suitable for constraining the porous specimen(s) in a desired configuration and for easy removal after deposition of the coatings.

To clarify the use of and to hereby provide notice to the public, the phrases "at least one of <A>, <B>, . . . and <N>" or "at least one of <A>, <B>, . . . or <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

While various embodiments have been described, it will be apparent to those of ordinary skill in the art that many more embodiments and implementations are possible. Accordingly, the embodiments described herein are examples, not the only possible embodiments and implementations.

The subject-matter of the disclosure may also relate, among others, to the following aspects:

A first aspect relates to a method of controlling dissolution of silicon carbide during melt infiltration to form a ceramic matrix composite, the method comprising: depositing an interface coating comprising boron nitride on silicon carbide fibers; depositing a barrier coating comprising silicon carbide on the interface coating; after depositing the barrier coating, infiltrating a fiber preform comprising the silicon carbide fibers with a melt comprising a silicon-boron alloy including boron at a concentration between 0.4 wt. % and 3.3 wt. %; and cooling the melt, thereby forming a ceramic matrix composite.

A second aspect relates to the method of the first aspect, wherein infiltration of the fiber preform with the melt takes place at a melt infiltration temperature below a melting temperature ($T_m$) of silicon.

A third aspect relates to the method of the second aspect, wherein the temperature is in a range from about 1385° C. to about 1410° C.

A fourth aspect relates to the method of any preceding aspect, wherein the ceramic matrix composite includes a ceramic matrix comprising silicon carbide and one or more silicon borides.

A fifth aspect relates to the method of the fourth aspect, wherein the one or more silicon borides comprise $SiB_3$, $SiB_4$, and/or $SiB_6$.

A sixth aspect relates to the method of any preceding aspect, wherein the melt comprising the silicon-boron alloy does not include carbon.

A seventh aspect relates to the method of any preceding aspect, wherein an additional protective layer is not deposited on the barrier coating, and the barrier coating is directly exposed to the melt comprising the silicon-boron alloy.

An eighth aspect relates to the method of any preceding aspect, further comprising, prior to forming the interface coating, providing the fiber preform by laying up a plurality of plies comprising tows of the silicon carbide fibers arranged in a two- or three-dimensional weave.

A ninth aspect relates to the method of any preceding aspect, wherein the interface coating and the barrier coating are formed by chemical vapor infiltration.

A tenth aspect relates to the method of any preceding aspect, further comprising, prior to infiltrating the fiber preform with the melt, infiltrating the fiber preform with a slurry comprising silicon carbide particles dispersed in a liquid carrier.

An eleventh aspect relates to the method of any preceding aspect, wherein a thickness of the barrier coating after infiltration with the melt is at least about 70% and up to 100% of the thickness of the barrier coating prior to melt infiltration.

A twelfth aspect relates a method of reducing dissolution of silicon carbide during melt infiltration to form a ceramic matrix composite, the method comprising: depositing an interface coating comprising boron nitride on silicon carbide fibers; depositing a barrier coating comprising silicon carbide on the interface coating; and after depositing the barrier coating, infiltrating a fiber preform comprising the silicon carbide fibers with a melt at a temperature below a melting temperature ($T_m$) of silicon, the melt comprising a silicon alloy including an alloying element in an amount selected to control dissolution of the barrier coating; and cooling the melt, thereby forming a ceramic matrix composite.

A thirteenth aspect relates to the method of the twelfth aspect, wherein the alloying element differs from elements present in the barrier coating.

A fourteenth aspect relates to the method of the twelfth or the thirteenth aspects, wherein the alloying element comprises boron, the melt thereby comprising a silicon-boron alloy.

A fifteenth aspect relates to the method of the fourteenth aspect, wherein the silicon-boron alloy includes boron at a concentration between 0.4 wt. % and 3.3 wt. %.

A sixteenth aspect relates to the method of any of the twelfth through the fifteenth aspects, wherein the melt infiltration temperature is in a range from about 1385° C. to about 1410° C.

A seventeenth aspect relates to the method of any of the twelfth through the sixteenth aspects, wherein the ceramic matrix composite includes a ceramic matrix comprising silicon carbide and one or more silicon borides.

An eighteenth aspect relates to the method of the seventeenth aspect, wherein the one or more silicon borides comprise $SiB_3$, $SiB_4$, and/or $SiB_6$.

A nineteenth aspect relates the method of any of the twelfth through the eighteenth aspects, wherein the melt does not include carbon.

A twentieth aspect relates to the method of any of the twelfth through the nineteenth aspects, wherein an additional protective layer is not deposited on the barrier coating, and the barrier coating is directly exposed to the melt comprising the silicon alloy.

A twenty-first aspect relates to the method of any of the twelfth through the twentieth aspects, further comprising, prior to forming the interface coating, providing the fiber preform by laying up a plurality of plies comprising tows of the silicon carbide fibers arranged in a two- or three-dimensional weave.

A twenty-second aspect relates to the method of any of the twelfth through the twenty-first aspects, wherein the interface coating and the barrier coating are formed by chemical vapor infiltration.

A twenty-third aspect relates to the method of any of the twelfth through the twenty-second aspects, further comprising, prior to infiltrating the fiber preform with the melt, infiltrating the fiber preform with a slurry comprising silicon carbide particles dispersed in a liquid carrier.

A twenty-fourth aspect relates to the method of any of the twelfth through the twenty-third aspects, wherein a thickness of the barrier coating after infiltration with the melt is at least about 70% and up to 100% of the thickness of the barrier coating prior to melt infiltration.

In addition to the features mentioned in each of the independent aspects enumerated above, some examples may show, alone or in combination, the optional features mentioned in the dependent aspects and/or as disclosed in the description above and shown in the figures.

What is claimed is:

1. A method of controlling dissolution of silicon carbide during melt infiltration to form a ceramic matrix composite, the method comprising:

depositing an interface coating comprising boron nitride on silicon carbide fibers;

depositing a barrier coating comprising silicon carbide on the interface coating;

after depositing the barrier coating, infiltrating a fiber preform comprising the silicon carbide fibers with a melt comprising a silicon-boron alloy including boron at a concentration between 0.4 wt. % and 3.3 wt. %, wherein the melt does not include carbon, chromium, titanium, vanadium, or molybdenum;

selecting the concentration of boron within the range to maintain a thickness of the barrier coating after infiltration with the melt that is at least 70% and up to 100% of the thickness of the barrier coating prior to melt infiltration; and cooling the melt, thereby forming a ceramic matrix composite.

2. The method of claim 1, wherein infiltration of the fiber preform with the melt takes place at a melt infiltration temperature below a melting temperature (Tm) of silicon.

3. The method of claim 2, wherein the temperature is in a range from about 1385° C. to about 1410° C.

4. The method of claim 1, wherein the ceramic matrix composite includes a ceramic matrix comprising silicon carbide and one or more silicon borides.

5. The method of claim 4, wherein the one or more silicon borides comprise $SiB_3$, $SiB_4$, and/or $SiB_6$.

6. The method of claim 1, wherein an additional protective layer is not deposited on the barrier coating, and the barrier coating is directly exposed to the melt comprising the silicon-boron alloy.

7. The method of claim 1, further comprising, prior to infiltrating the fiber preform with the melt, infiltrating the fiber preform with a slurry comprising silicon carbide particles dispersed in a liquid carrier.

8. A method of reducing dissolution of silicon carbide during melt infiltration to form a ceramic matrix composite, the method comprising:

depositing an interface coating comprising boron nitride on silicon carbide fibers;

depositing a barrier coating comprising silicon carbide on the interface coating; and after depositing the barrier coating, infiltrating a fiber preform comprising the silicon carbide fibers with a melt at a temperature below a melting temperature (Tm) of silicon, the melt comprising a silicon-boron alloy that does not include carbon, chromium, titanium, vanadium, or molybdenum, with the amount of boron in the silicon-boron alloy selected to control dissolution of the barrier coating such that that a thickness of the barrier coating after infiltration with the melt is at least 70% and up to 100% of the thickness of the barrier coating prior to melt infiltration, and cooling the melt, thereby forming a ceramic matrix composite.

9. The method of claim 8, wherein boron is not present in the barrier coating.

10. The method of claim 8, wherein the silicon-boron alloy includes boron at a concentration between 0.4 wt. % and 3.3 wt. %.

11. The method of claim 8, wherein the melt infiltration temperature is in a range from about 1385° C. to about 1410° C.

12. The method of claim 8, wherein the ceramic matrix composite includes a ceramic matrix comprising silicon carbide and one or more silicon borides.

13. The method of claim 12, wherein the one or more silicon borides comprise $SiB_3$, $Si8_4$, and/or $SiB_6$.

14. The method of claim 8, wherein an additional protective layer is not deposited on the barrier coating, and the barrier coating is directly exposed to the melt comprising the silicon-boron alloy.

15. The method of claim 8, further comprising, prior to infiltrating the fiber preform with the melt, infiltrating the fiber preform with a slurry comprising silicon carbide particles dispersed in a liquid carrier.

* * * * *